(12) United States Patent
Hux (10) Patent No.: US 7,173,615 B2
(45) Date of Patent: Feb. 6, 2007

(54) GENERATING A MESH

(75) Inventor: William A. Hux, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 10/338,797

(22) Filed: Jan. 7, 2003

(65) Prior Publication Data

US 2004/0130547 A1 Jul. 8, 2004

(51) Int. Cl.
*G06T 17/00* (2006.01)

(52) U.S. Cl. .................. 345/424; 345/419; 345/420; 345/421; 345/427; 382/154; 382/205

(58) Field of Classification Search ............... 345/419, 345/424, 420, 427, 421; 382/154, 205
See application file for complete search history.

(56) References Cited

U.S. PATENT DOCUMENTS

| | | | | |
|---|---|---|---|---|
| 5,442,733 | A | * | 8/1995 | Kaufman et al. ........... 345/424 |
| 5,898,793 | A | * | 4/1999 | Karron et al. .............. 382/131 |
| 6,342,886 | B1 | * | 1/2002 | Pfister et al. .............. 345/424 |
| 6,867,773 | B2 | * | 3/2005 | Hux ........................... 345/424 |
| 2003/0052875 | A1 | * | 3/2003 | Salomie ..................... 345/419 |
| 2004/0130548 | A1 | | 7/2004 | Hux | |

OTHER PUBLICATIONS

"Marching Cubes: A High Resolution 3D Surface Construction Algorithm"; William E. Lorensen, Harvey E. Cline; Computer Graphics; Siggraph '87 Conference Proceedings; Jul. 27-31, 1987; vol. 21, No. 4; Jul. 1987; ACM Siggraph; pp. 163-169.
"Rapid Octree Construction from Image Sequences"; Richard Szeliski; Image Understanding; ISSN 1049-9660; vol. 58, No. 1, Jul. 1993; Academic Press, Inc.; pp. 23-32.
"Surface reconstruction from Unorganized Points"; Hugues Hoppe et al.; Computer Graphics Proceedings; Siggraph '92; vol. 26, No. 2, Jul. 1992; pp. 71-78.
Automatic Reconstruction of 3D Objects Using a mobile Monoscopic Camera; W. Niem, et al.; Proceedings International Conference on Recent Advances in 3-D Digital Imaging and Modeling; May 12-15, 1997; National Research Council Canada; pp. 173-180.

* cited by examiner

*Primary Examiner*—Kimbinh T. Nguyen
(74) *Attorney, Agent, or Firm*—Fish & Richardson P.C.

(57) ABSTRACT

A method of generating a mesh includes locating a reference voxel. The reference voxel is inside a surface of an object and is adjacent to at least one voxel outside the surface. The method also includes, for a voxel outside the surface adjacent to the reference voxel, determining a set of contributing voxels by finding adjacent voxels on the same surface as the reference voxel using morph operators. The method further includes forming triangles with adjacent contributing voxels and the reference voxel. Each triangle has unique directional edges with respect to the other triangles.

30 Claims, 12 Drawing Sheets

|   |   |   |
|---|---|---|
| 0 | 1 | 2 |
| 3 | 4 | 5 |
| 6 | 7 | 8 |

TOP

FIG. 7A

|   |   |   |
|---|---|---|
| 9 | 10 | 11 |
| 12 | 13 | 14 |
| 15 | 16 | 17 |

MIDDLE

FIG. 7B

|   |   |   |
|---|---|---|
| 18 | 19 | 20 |
| 21 | 22 | 23 |
| 24 | 25 | 26 |

BOTTOM

GENERATING A MESH

TECHNICAL FIELD

This disclosure relates to three-dimensional (3D) graphics and, in particular, to mesh generation.

BACKGROUND

A two-dimensional area (2D) can be divided into square units called pixels. Likewise, a 3D volume can be divided into cubical units called voxels. In much the same way that a camera can be used to create a 2D pixel representation of a real-world object by taking a picture, a 3D voxel representation of a real-world object can be constructed by taking many pictures of an object from different angles. Other techniques for generating a 3D voxel representation include using laser range-finding techniques.

DESCRIPTION

Figure 1:
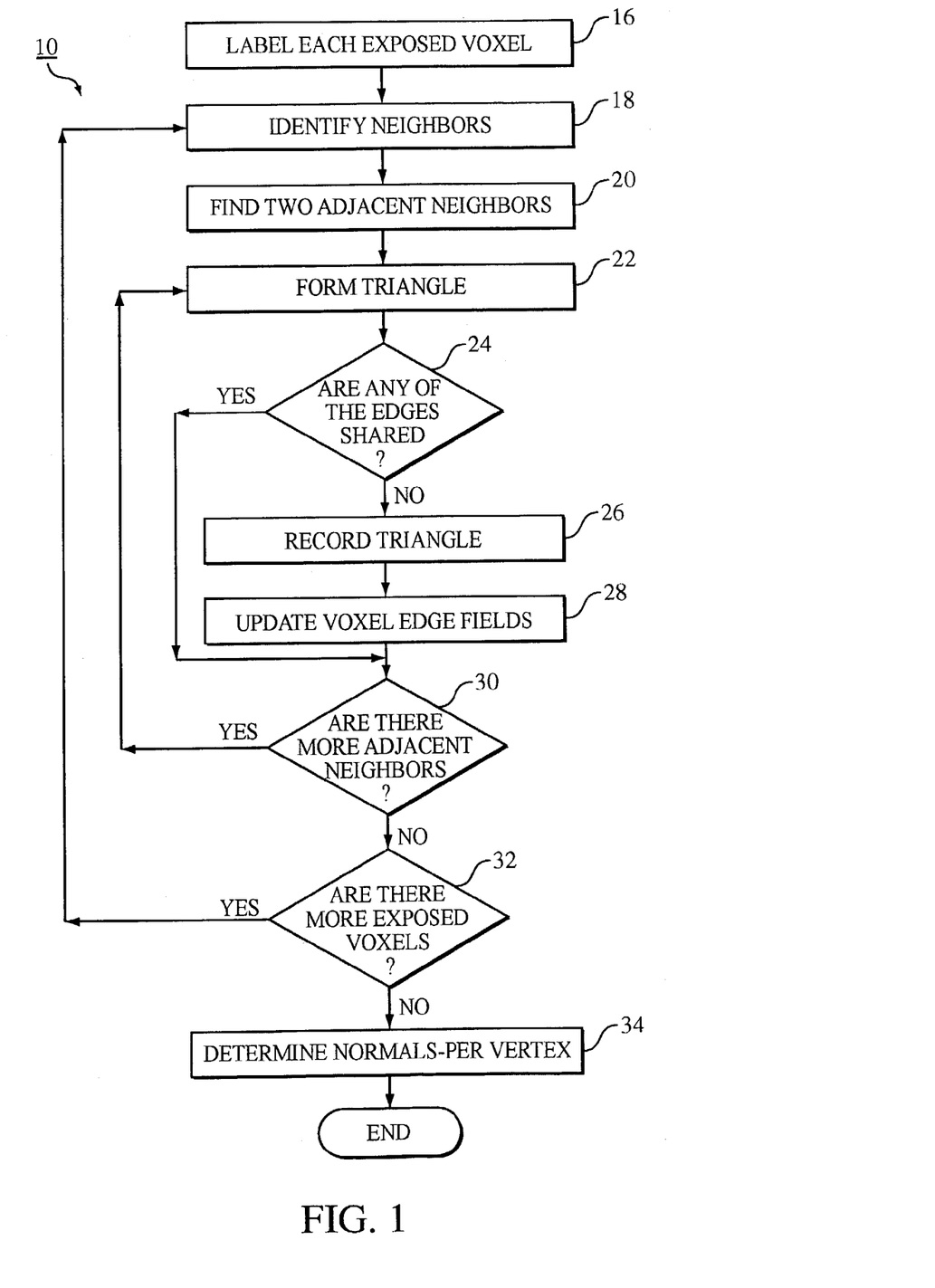
FIG. 1 is a flowchart of a process to generate a mesh.
Figure 2:
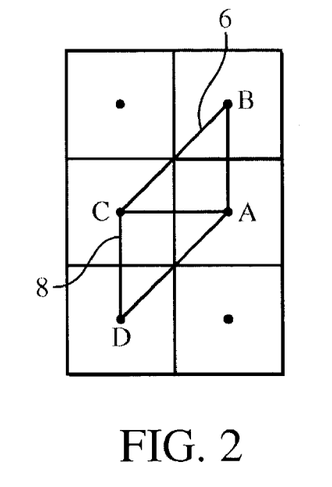
FIG. 2 is a diagram of triangles in a mesh.

Referring to FIGS. 1 and 2, a process 10 produces a mesh from a voxel representation that is suitable for rendering on computer graphical systems. Typically, a mesh is an array of position values (e.g., vectors having three real numbers), and a description of the connectivity required between the position values to form triangles. The order in which the triangles are generated affects the mesh.

By way of example, a triangle 6 has three indices, A, B and C. The indices are connected in a counter-clockwise direction. Thus, triangle 6 is connected from A to B, from B to C, and from C to A. The connections from A to B, from B to C, and from C to A are known as edges. Each edge has a direction. For example, a triangle 8 with indices A, C and D has edges from A to C, from C to D, and from D to A. Even though triangle 6 and triangle 8 each have indices A and C, they do not share the same edges, because the edge from A to C is in the opposite direction from the edge from C to A.

Figure 3:
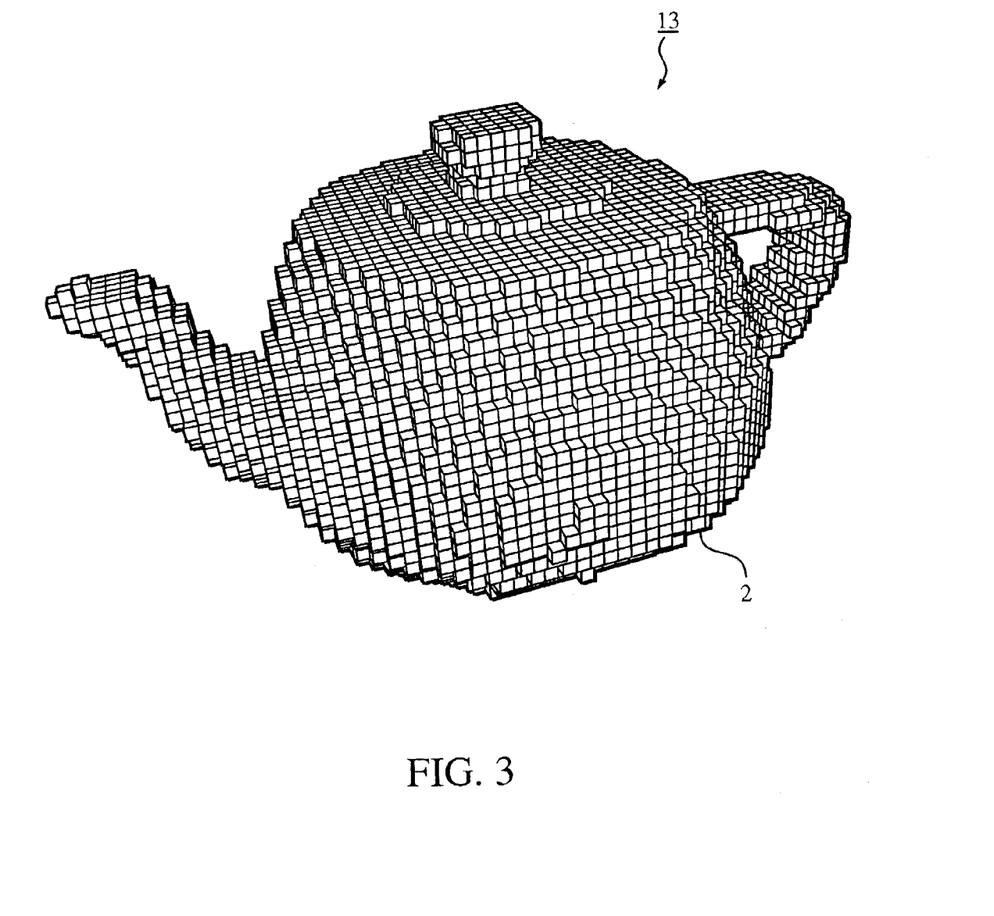
FIG. 3 is a voxel representation of a teapot prior to using the process in FIG. 1.

Referring to FIG. 3, a voxel representation contains cubically shaped voxels that are labeled as either an "inside" voxel or an "outside" voxel. The "inside" voxels are inside a surface of a real-world object. The "outside" voxels are outside the surface of the real-world object. For example, a voxel representation 13 of a teapot has inside voxels 2 and outside voxels (not shown). When a side of inside voxel 2 is adjacent to an outside voxel, that side is exposed. Thus, in FIG. 3, all the inside voxels that are visible have at least one exposed surface.

Process 10 analyzes exposed voxels, determines neighbors of each of the exposed voxels, and forms a mesh by generating unique triangles from voxels that neighbor each exposed voxel.

Referring back to FIG. 1, process 10 labels (16) each exposed voxel with a unique index value, such as 1, 2, 3, 4, etc, and a voxel edge field. The voxel edge field may be a 32-bit wide field that records edge traversals. In this example, the field initially contains the hexidecimal value 0x00008000. As explained below, a bit in the 32-bit wide field is shifted either left or right to describe the direction of the edge of a triangle formed from the voxels.

Figure 4:
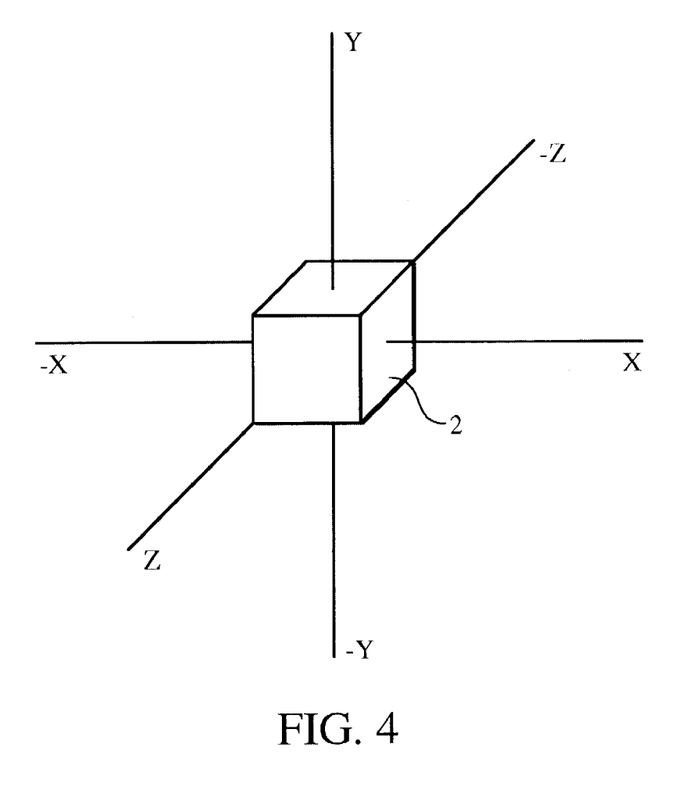
FIG. 4 is a diagram showing six directions with respect to a voxel.

Process 10 identifies (18) neighbors for each exposed voxel. Referring to FIG. 4, voxels are evaluated one-at-a-time. When a voxel is being evaluated, that voxel is called a "reference voxel." Each side of an inside voxel 2 represents a direction. Accordingly, each voxel defines six directions, such as Cartesian x, −x, y, −y, z and −z directions. Process 10 identifies (18), in each of the six directions, which voxels neighboring a reference voxel contribute to the same surface of the reference voxel. An exemplary subprocess 23 for identifying (18) neighboring voxels that are on the same surface as the reference voxel is shown in detail in FIG. 5.

Figure 5:
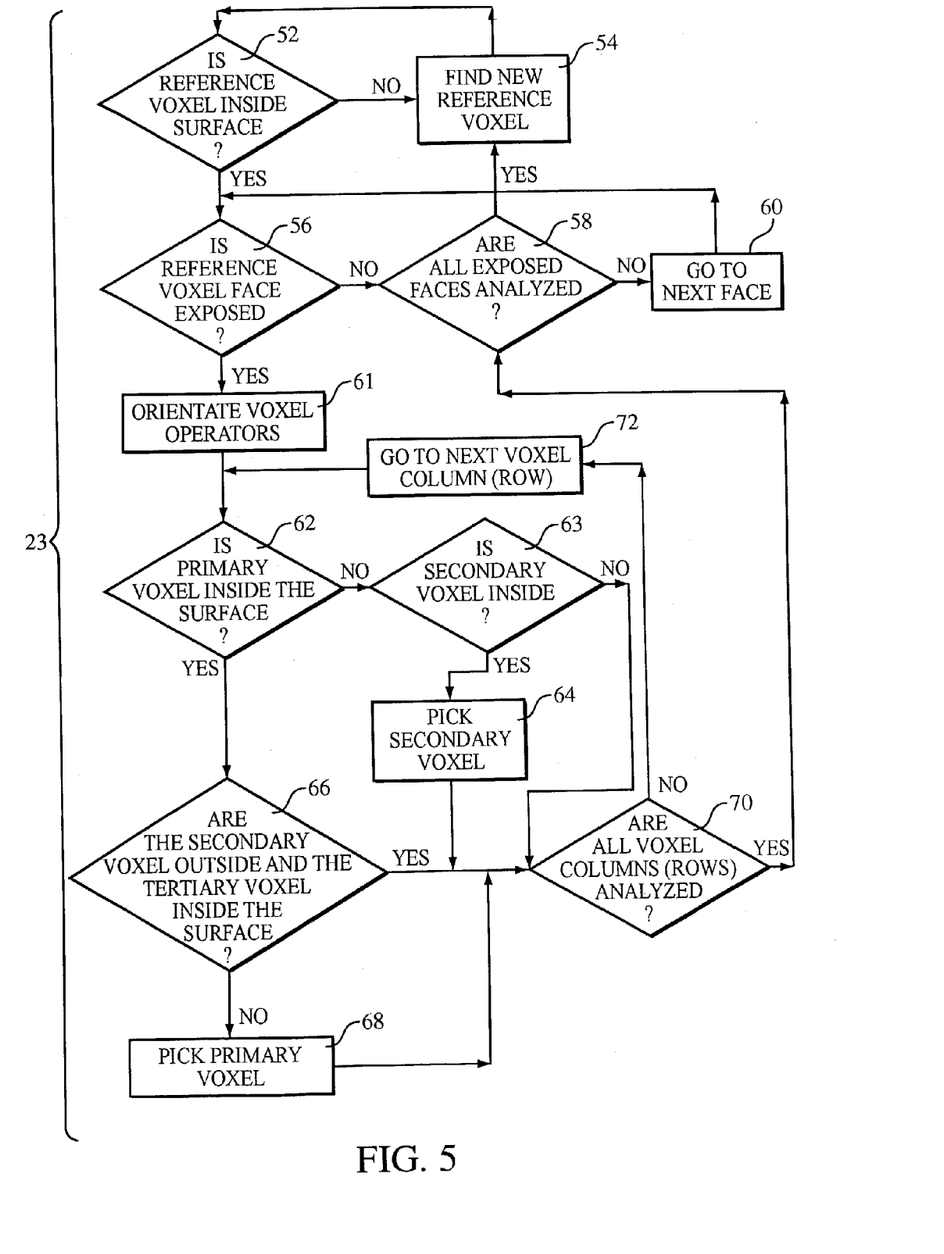
FIG. 5 is a flowchart for a process to identify voxels in the same surface as a reference voxel.

Subprocess 23 determines if the reference voxel has an exposed face and determines which voxels adjacent to the reference voxel contribute to the same surface as the reference voxel. Subprocess 23 uses voxel morph operators (described below) to determine which voxels contribute to the same surface as the reference voxel.

Subprocess 23 determines (52) if the reference voxel is an inside voxel or an outside voxel by, e.g., analyzing how the reference voxel is assigned in the voxel representation. If the reference voxel is not an inside voxel (i.e., the reference voxel is outside voxel), subprocess 23 finds (54) the next (new) reference voxel. If the reference voxel is an inside voxel, starting in one of the six directions, subprocess 23 determines (56) if the voxel has an exposed side. This may be done by determining if the inside voxel is adjacent to an outside voxel.

If the side is not an exposed face, subprocess 23 determines (58) if all exposed sides of the reference voxel have been checked. If not, subprocess 23 goes (60) to another side of the reference voxel not analyzed. If all exposed sides of the reference voxel have been analyzed, subprocess 23 finds (54) a new reference voxel that has not already analyzed.

If the reference voxel has an exposed face, then subprocess 23 determines which voxels adjacent to the reference voxel contribute to the same surface as the reference voxel. Subprocess 23 uses voxel morph operators, such as those described below, to make this determination.

Figure 6A:
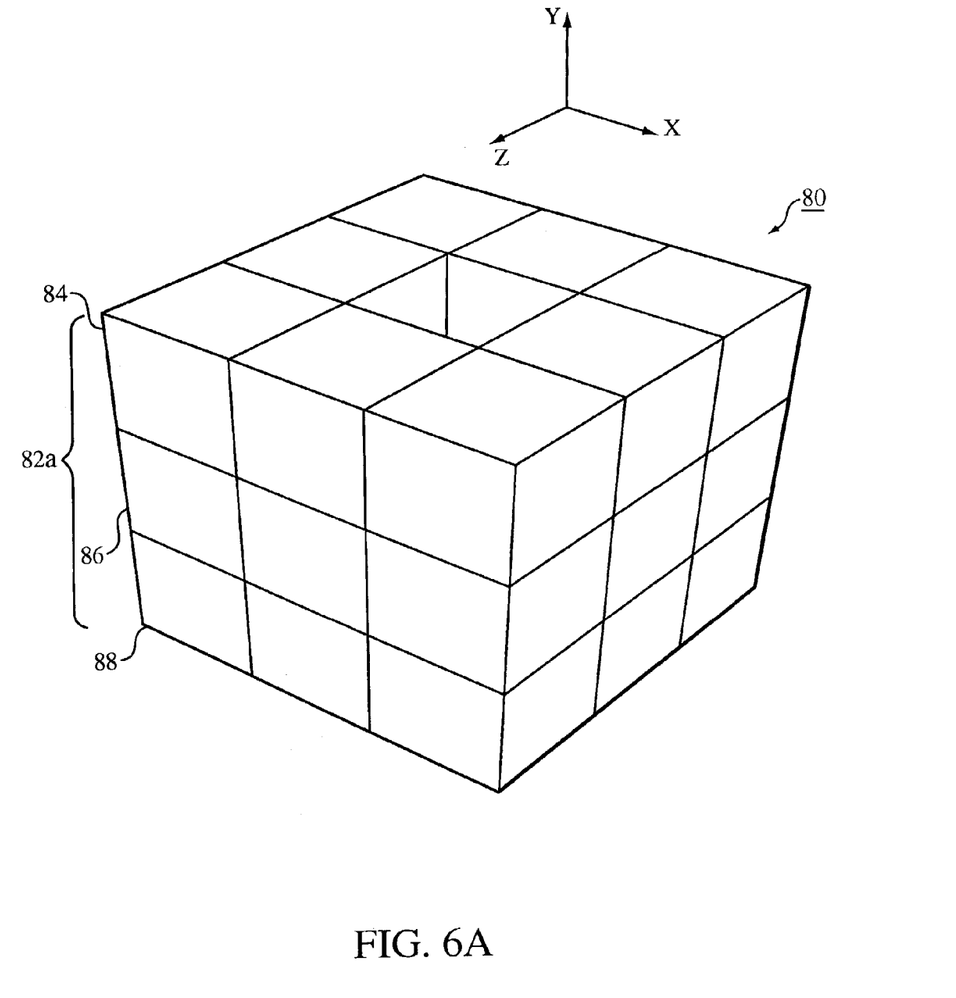
FIG. 6A is a view of a voxel operator in the y-direction.
Figure 6B:
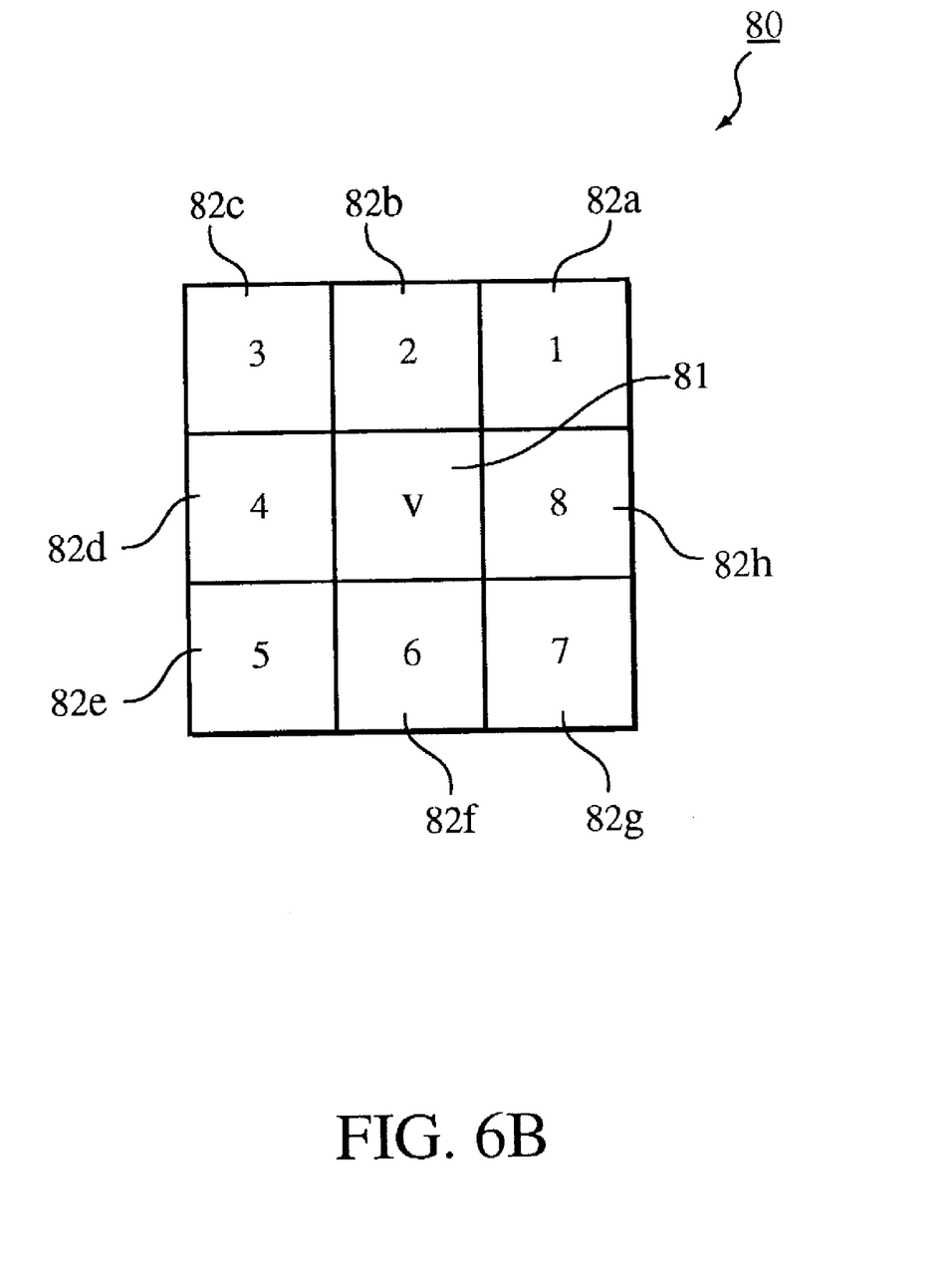
FIG. 6B is a top view of the voxel operator.

Referring to FIGS. 6A and 6B, to understand voxel morph operators, consider a reference voxel 81 (FIG. 6B) located in the center of a three-by-three-by-three (3×3×3) cube 80. Also, assume that the voxel (not shown) above (y-direction) and adjacent to reference voxel 81 is an outside voxel and therefore 3×3×3 cube 80 is in a y-operator position. In the y-operator position, the voxel above reference voxel 81 and the voxel below the reference voxel are ignored. Thus, 3×3×3 cube 80 includes eight columns 82 (e.g., voxel column 82a, voxel column 82b, voxel column 82c, voxel column 82d, voxel column 82e, voxel column 82f, voxel column 82g and voxel column 82h) of three voxels each and reference voxel 81 in the center of the 3×3×3 cube. Each column 82 has a primary voxel 84 on top, a secondary voxel 86 in the middle and a tertiary voxel 88 on the bottom (FIG. 6A). Subprocess 23 analyzes the eight columns 82 of voxels one at a time in a counterclockwise fashion to determine which of the three voxels (primary voxel 84, secondary voxel 86, and tertiary voxel 88) in column 82 are on the same surface as reference voxel 81.

If the next exposed face to be analyzed is in the x-direction, 3×3×3 cube 80, excluding the reference voxel, rotates so that the primary voxels are facing the x-direction. What rotates is not the actual voxel themselves, but the voxel operators or what is designated as a primary voxel, a secondary voxel, and a tertiary voxel. Therefore, instead of having columns of voxels to analyze, there are rows. In other words, a voxel that is a primary voxel in one direction may be a tertiary voxel in another direction.

Referring back to FIG. 5, after determining that a reference voxel is exposed, subprocess 23 orientates the voxel operators. Subprocess 23 determines (62) if the primary voxel is an inside voxel. If it is not, subprocess 23 determines (63) if the secondary voxel is inside the surface. If the secondary voxel is inside the surface, subprocess 23 picks (64) the secondary voxel. If primary voxel 84 is an inside voxel, subprocess 23 determines (66) if the secondary voxel 86 is an outside voxel and the tertiary voxel 88 is an inside voxel. If secondary voxel 86 is an outside voxel and tertiary voxel 88 is an inside voxel, subprocess 23 does not pick any voxel. If secondary voxel 86 is not an outside voxel or tertiary voxel 88 is not an inside voxel, subprocess 23 picks (68) the primary voxel.

After a column of voxels (or rows depending on the orientation of the voxel operators) has been analyzed, subprocess 23 determines (70) if all eight voxel columns have been analyzed. If all eight columns have been analyzed, subprocess 23 determines (58) if there are any more exposed faces left to be analyzed. If more columns remain, subprocess 23 goes (72) to the next column. Every time a voxel is picked by subprocess 23, it is tagged as a contributing neighbor to the reference voxel.

Figure 7A:
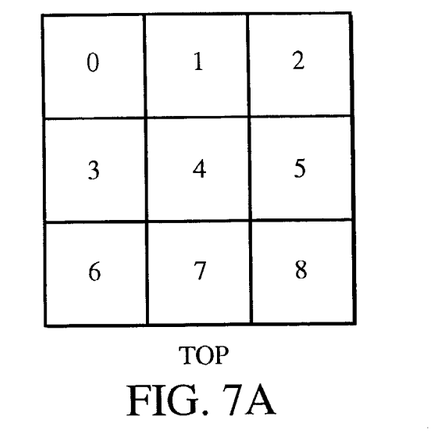
FIGS. 7A–7C is a neighborhood addressing scheme.
Figure 7B:
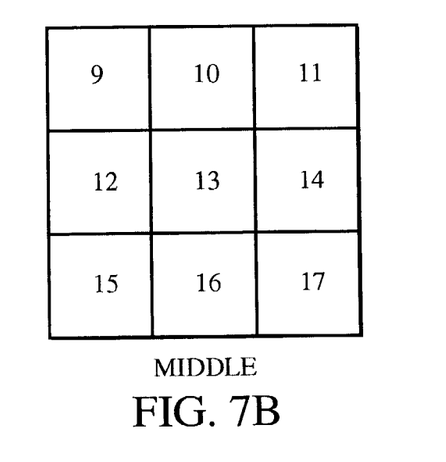
Figure 7C:
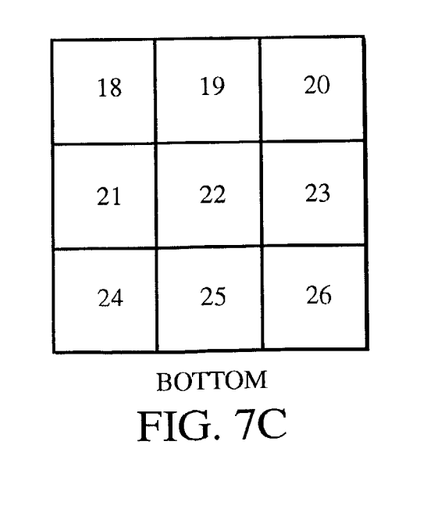

Referring to FIGS. 7A–7C, the 3×3×3 matrix is represented in a neighborhood addressing scheme as 27 voxels numbered from 0 to 26 so that the primary voxels are numbered 0 to 8 (FIG. 7A), the secondary voxels are numbered 9 to 17 and the tertiary voxels are numbered 18 to 26. The reference voxel is numbered as 13. As will be shown below, this neighborhood addressing scheme is used to record the edge traversals. Referring back to FIGS. 1 and 2, process 10 finds (20) two adjacent voxels from neighboring identified voxels. Consider that a voxel at 9, called "B", a voxel at 10, called "C", and a voxel at 15, called "D", are determined to be neighbors of the reference voxel, called "A". Process 10 picks B and C because they are adjacent. Process 10 forms (22) a triangle between the adjacent neighbors, B and C, and A. The triangles are formed by beginning with the reference voxel at 13. Starting in a counterclockwise order, A is connected to C. The second connection is made from the C to B. The final connection is made from B to A.

Process 10 determines (24) if there are any edges shared by any other triangles. Using the previous example, process 10 determines that there are no other edges that have a vector starting from A and going to C, a vector starting from C going to B, or a vector starting from B going to A. If there are no shared edges, process 10 records (26) the triangle by outputting the unique index value contained in each voxel's data structure in the order the triangle was generated starting. Using the previous example, this would be "A, C, B".

Process 10 updates (28) the voxel edge field for each voxel in the triangle. Using the neighborhood addressing scheme, each edge traversal is recorded by taking the numeric difference and bit-shifting by that difference. Positive differences are shifted to the right and negative differences are shifted to the left. Using the example above, A is connected to C, the difference between the numeric values is 13 minus 10 or 3. Since 3 is a positive number, the bit in 0x00008000 in the edge field of A is shifted to the right three times to generate the hexadecimal value 0x00001000. This value is used with a binary "or" and placed into edge field of A. Since C is connected to B, the difference is 10 minus 9 or 1. The bit is shifted to the right 1 to generate the hexadecimal value 0x00004000. This value is used with binary "or" and placed into the edge field of C. Since B is connected to A, the difference is 9 minus 13 or –4. Since –4 is a negative number, the bit is shifted to the left 4 times to generate a hexadecimal value of 0x00080000. This value is used with a binary "or" and placed into the edge field of B.

If there are shared edges, process 20 determines (30) if there are other adjacent neighbors. If there are additional adjacent neighbors, process 10 forms (22) another triangle. If there are no more adjacent neighbors, process 10 determines (32) if there are any more exposed voxels. If there are more exposed voxels, process 10 identifies (18) neighbors.

Figure 8:
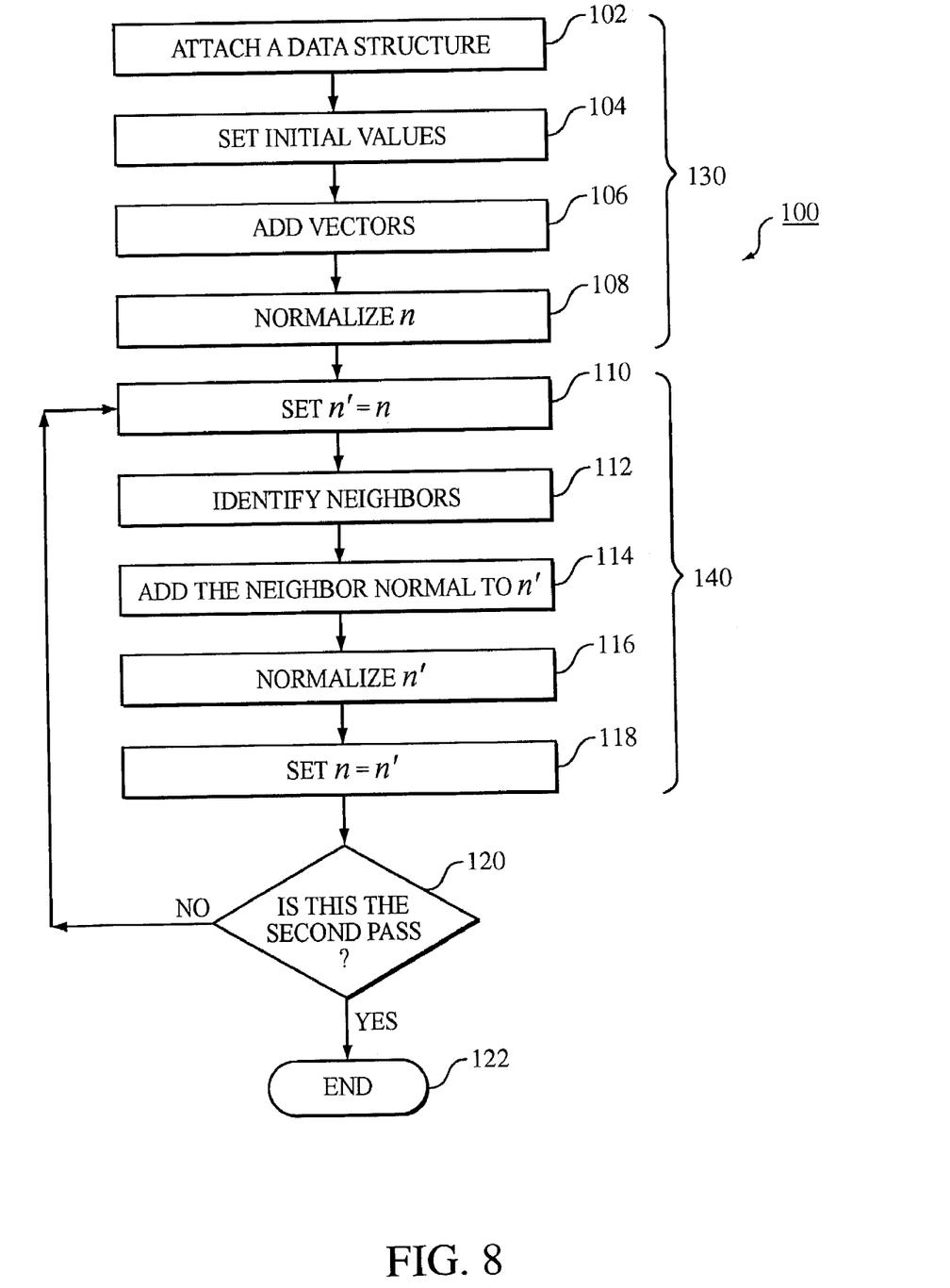
FIG. 8 is a diagram of normals to a surface.

Referring to FIG. 8, if there are no additional neighbors, process 10 performs (34) a smoothing of the mesh using a process 100. Process 100 analyzes the exposed sides of the inside voxel cube and takes an initial guess about the surface orientation using a subprocess 130. Then, process 100 uses voxel morph operators to average the orientations of the voxel cube's neighboring voxels using subprocess 140.

Figure 9:
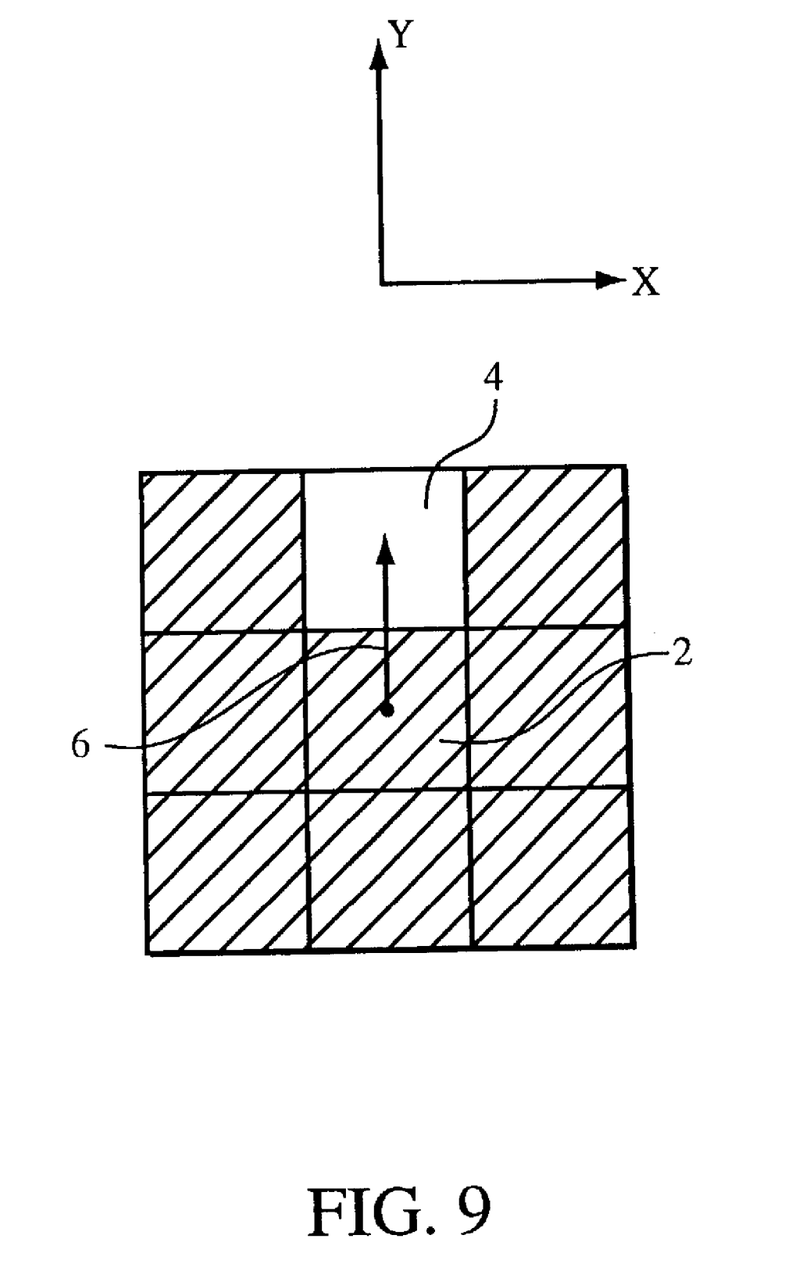
FIG. 9 is a flowchart for a process to generate surface normals.

Referring to FIGS. 8 and 9, subprocess 130 attaches (102), to each inside voxel, that is adjacent to an outside voxel, a data structure containing two three-value vectors, which represent the normal to the surface of the inside voxel, n, and a temporary vector, n'. Subprocess 130 sets (104) the initial value of n and n' each to be (0, 0, 0). Subprocess 130 adds (106) to n a value of any vector pointing in the direction of an outside voxel. For example, if there is an outside voxel 4 in the y direction, subprocess 130 adds a (0, 1, 0) vector 6 to n. Subprocess 130 normalizes (108) n.

Subprocess 140 sets (110) n' equal to n. Subprocess 140 evaluates inside voxels that are adjacent to at least one outside voxel. The inside voxels are evaluated one-at-a-time so that when an inside voxel is being evaluated it is called a reference voxel. Subprocess 140 identifies (112) in each of the six directions, which voxels neighboring the reference voxel contribute to the same surface of the reference voxel. An exemplary implementation for identifying (112) neighboring voxels that are on the same surface as the reference voxel is shown in detail in FIG. 5.

Referring back to FIG. 9, subprocess 140 adds (114) the tagged neighbor normals to n'. Subprocess 140 normalizes (116) n'. For each inside voxel that is adjacent to an outside voxel, subprocess 140 sets (118) n equal to n'.

Process 100 determines (120) if subprocess 140 has completed two passes. If two passes have not been completed, subprocess 140 is repeated. If two passes have been completed, process 100 is terminated (122). In other embodiments, process 100 passes through subprocess 140 once. In still other embodiments, process 100 passes through subprocess 140 three times.

Figure 10A:
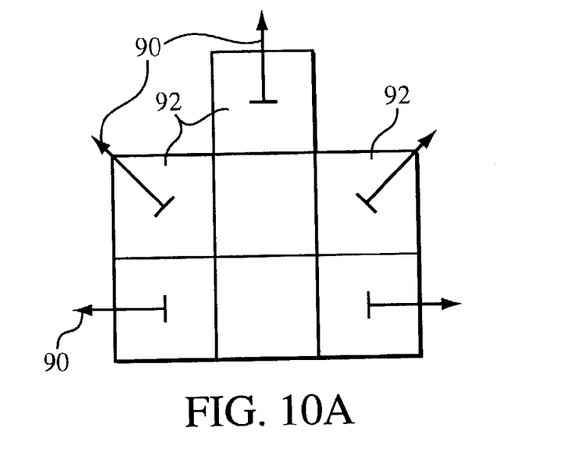
FIG. 10A is a two-dimensional diagram depicting normals to a surface of an object after an initial guess.
Figure 10B:
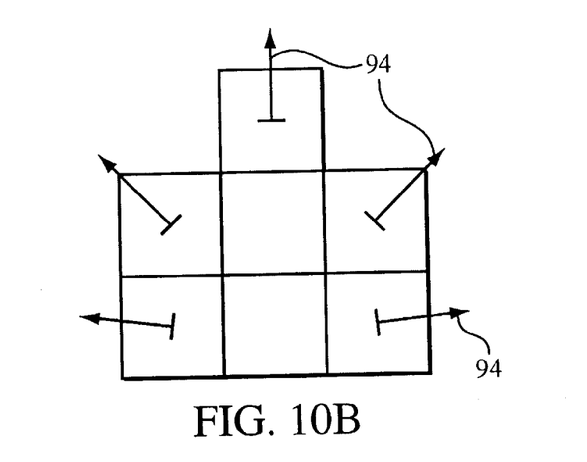
FIG. 10B is a diagram depicting normals to the surface of the object after using a subprocess of the process in FIG. 9 once.
Figure 10C:
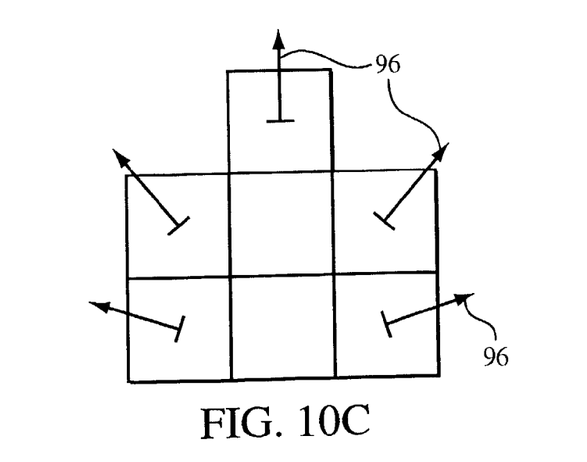
FIG. 10C is a diagram depicting normals to the surface of the object after using the subprocess of the process in FIG. 9 twice.

The result of the subprocess 130 is an initial guess of normals 90 for voxels 92 having exposed faces as shown in FIG. 10A. Normals 90 are modified to form normals 94 as shown in FIG. 10B after one pass through subprocess 140. Normals 94 are modified to form normals 96 as shown in FIG. 10C after a second pass through subprocess 140.

Figure 11:
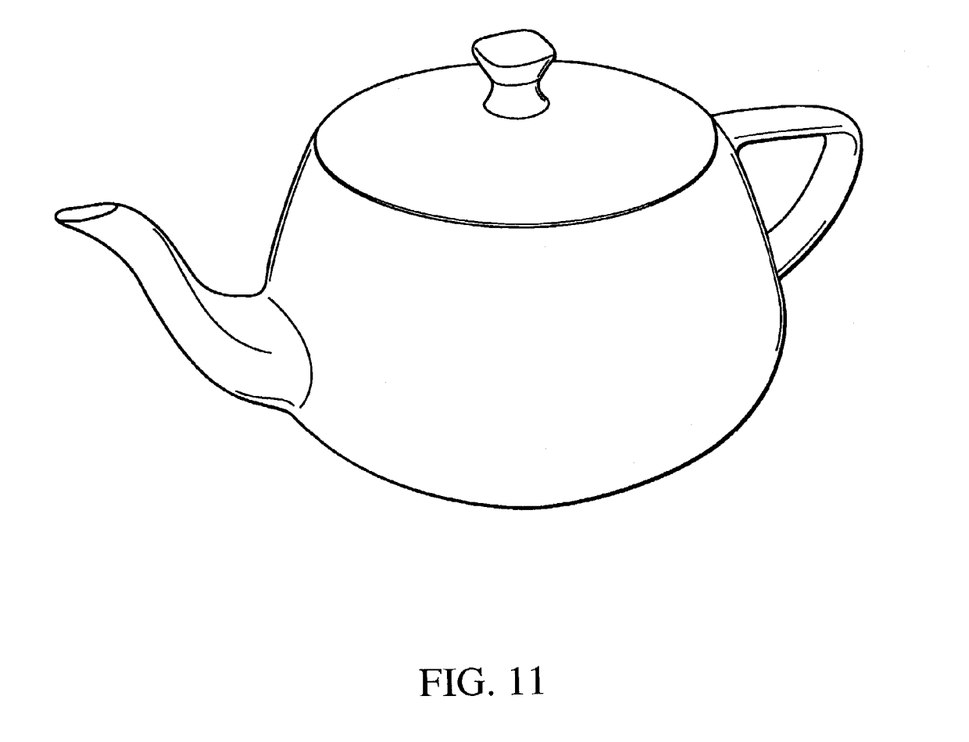
FIG. 11 is a mesh of a teapot after performing the process in FIG. 1.

The result of process 100 has each voxel having a corresponding three-value vector describing its normal in 3D space. This normal can be considered to be a reasonable approximation of the surface orientation near the center of the voxel. The voxels are reoriented to produce a smooth surface such as that shown in FIG. 11. Thus, process 100 forms a smooth approximation of the surface orientation at each point.

Figure 12:
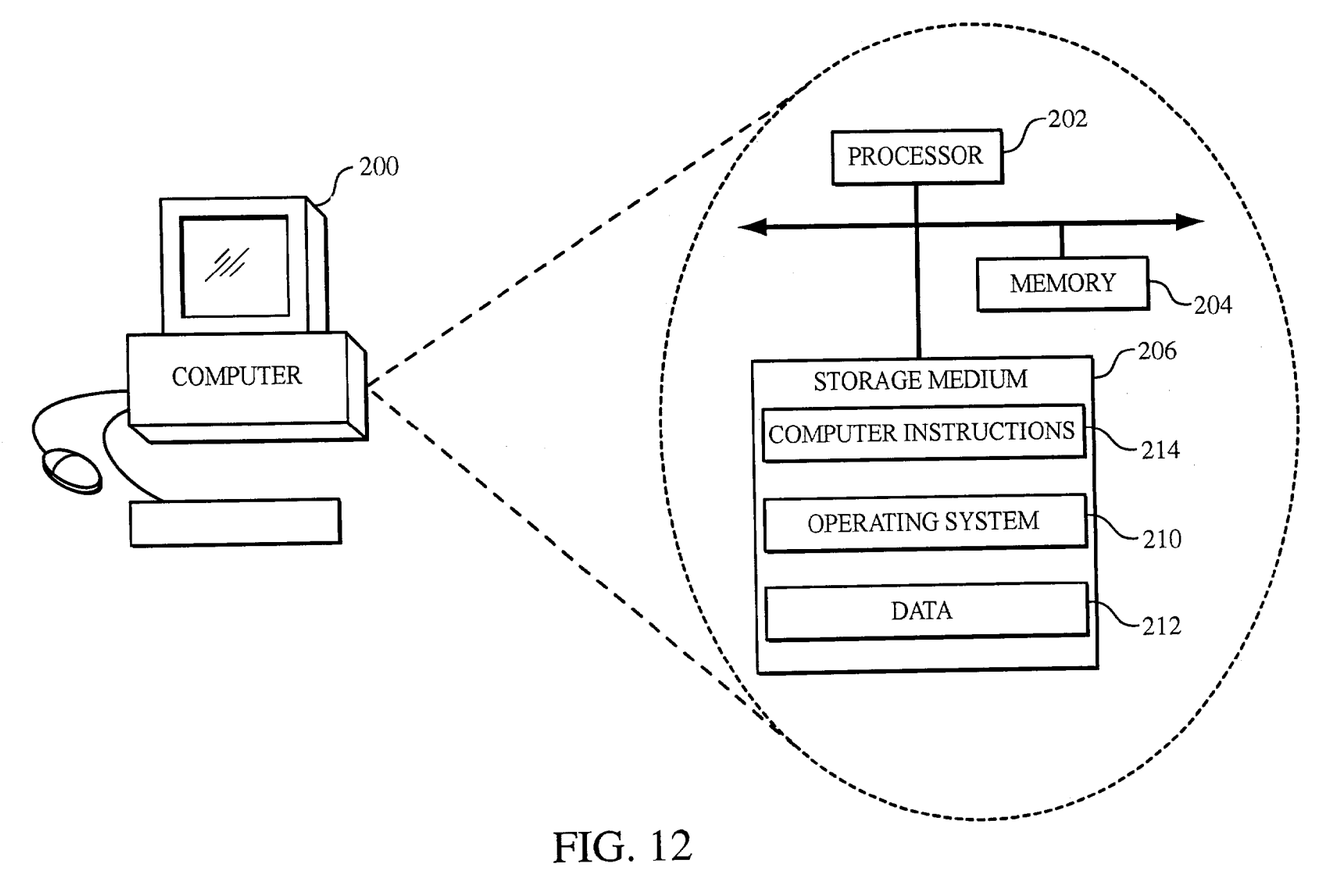
FIG. 12 is a block diagram of a computer system on which the process of FIG. 1 may be implemented.

FIG. 12 shows a computer 200 for mesh generation using process 10. Computer 200 includes a processor 202, a memory 204, and a storage medium 206 (e.g., hard disk). Storage medium 206 stores operating system 210, data 212 for voxel centers and temporary voxel centers, and computer instructions 214 which are executed by processor 202 out of memory 204 to perform process 10.

Process 10 is not limited to use with the hardware and software of FIG. 12; it may find applicability in any computing or processing environment and with any type of machine that is capable of running a computer program. Process 10 may be implemented in hardware, software, or a combination of the two. For example, process 10 may be implemented in a circuit that includes one or a combination of a processor, a memory, programmable logic and logic gates. Process 10 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 10 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform process 10. Process 10 may also be implemented as a machine-readable storage medium, configured with a computer program, where upon execution, instructions in the computer program cause the computer to operate in accordance with process 10.

The process is not limited to the specific embodiments described herein. For example, the voxels do not need to be uniform in size, nor do the voxels need to be cubical. Also, the voxel morph operators need not be in a 3×3×3 cube. For example, the voxel morph operators can be in a pyramid configuration. In addition, voxel smoothing may be done in many different ways including averaging the face normals from the topology or using the voxel morph operators to select voxels to pass into an eigen analysis. The process is not limited to the specific processing order of FIGS. 1, 5 and 9. Rather, the blocks of FIGS. 1, 5 and 9 may be re-ordered, as necessary, to achieve the results set forth above.

Other embodiments not described herein are also within the scope of the following claims.

What is claimed is:

1. A method of generating a mesh, comprising:
locating a reference voxel, the reference voxel being inside a surface of an object and being adjacent to at least one voxel outside the surface;
for a voxel outside the surface adjacent to the reference voxel, determining a set of contributing voxels by finding adjacent voxels on the same surface as the reference voxel using voxel morph operators; and
forming triangles with adjacent contributing voxels and the reference voxel, each triangle having unique directional edges with respect to the other triangles.

2. The method of claim 1, wherein each voxel has a voxel edge field, the method further comprising:
recording each triangle; and
updating the voxel edge field for every voxel in each triangle.

3. The method of claim 1, further comprising;
after possible triangles have been determined, performing smoothing.

4. The method of claim 3, wherein performing smoothing comprises:
analyzing an exposed side of a reference voxel, the reference voxel having neighbor voxels, each neighbor voxel having a surface orientation;
taking an initial guess about the surface orientation; and
using voxel morph operators to average the surface orientations.

5. The method of claim 4, wherein taking an initial guess about the surface orientations comprises:
attaching a data structure to the reference voxel, the data structure having a normal vector, n, and a temporary vector, n';
adding a vector corresponding to each side adjacent to an outside voxel; and
normalizing n.

6. The method of claim 5, wherein using voxel morph operators to average the orientations of the neighbor voxels, comprises:
identifying the voxels around the reference voxel that contribute to a same surface as the reference voxel;
normalizing n'; and
setting n equal to n'.

7. The method of claim 1, wherein determining comprises:
evaluating a primary voxel corresponding to a side of a reference voxel, the side of the reference voxel being attached to an outside voxel, the primary voxel being adjacent to the outside voxel and adjacent to a corresponding secondary voxel, the secondary voxel being adjacent to a corresponding tertiary voxel; and
determining whether the primary voxel, the secondary voxel or the tertiary voxel is on a same surface as the reference voxel.

8. The method of claim 7, further comprising:
evaluating up to eight primary voxels for each side of the reference voxel that is attached to the outside voxel; and
using a three by three by three (3×3×3) volume of voxels to include the eight primary voxels, the corresponding eight secondary voxels, and the corresponding eight tertiary voxels, the reference voxel being in the center of the 3×3×3 volume.

9. The method of claim 8, wherein determining whether the primary voxel, the secondary voxel or the tertiary voxel is on a same surface as the reference voxel comprises picking the primary voxel if the primary voxel is inside, the surface of the object unless the corresponding secondary voxel is outside the surface of the object and the corresponding tertiary voxel is inside the surface of the object.

10. The method of claim 8, wherein determining whether the primary voxel, the secondary voxel or the tertiary voxel is on a same surface are as the reference voxel comprises picking the secondary voxel if the primary voxel is outside the surface of the object and the secondary voxel is inside the surface of the object.

11. An apparatus for generating a mesh, the apparatus comprising:
    circuitry to:
    locate a reference voxel, the reference voxel being inside a surface of an object and being adjacent to at least one voxel outside the surface;
    for a voxel outside the surface adjacent to the reference voxel, determine a set of contributing voxels by finding adjacent voxels on the same surface as the reference voxel using voxel morph operators; and
    form triangles with adjacent contributing voxels and the reference voxel, each triangle having unique directional edges with respect to the other triangles.

12. The apparatus of claim 11, wherein the circuitry comprises at least one of a processor, a memory, programmable logic and logic gates.

13. The apparatus of claim 11, wherein each voxel has a voxel edge field, the apparatus further comprising circuitry to:
    record each triangle; and
    update the voxel edge field for every voxel in each triangle.

14. The apparatus of claim 11, further comprising circuitry to:
    after possible triangles have been determined, perform smoothing.

15. The apparatus of claim 14, wherein to perform smoothing comprises:
    analyzing an exposed side of a reference voxel, the reference voxel having neighbor voxels, each neighbor voxel having a surface orientation;
    taking an initial guess about the surface orientation; and
    using voxel morph operators to average the surface orientations.

16. The apparatus of claim 15, wherein to take an initial guess about tile surface orientations comprises:
    attaching a data structure to the reference voxel, the data structure having a normal vector, n, and a temporary vector, n';
    adding a vector corresponding to each side adjacent to an outside voxel; and
    normalizing n.

17. The apparatus of claim 11, wherein circuitry to determine comprises circuitry to:
    evaluate a primary voxel corresponding to a side of a reference voxel, the side of the reference voxel being attached to an outside voxel, the primary voxel being adjacent to the outside voxel and adjacent to a corresponding secondary voxel, the secondary voxel being adjacent to a corresponding tertiary voxel; and
    determine whether the primary voxel, the secondary voxel or the tertiary voxel is on a same surface as the reference voxel.

18. The apparatus of claim 17, further comprising circuitry to;
    evaluate up to eight primary voxels for each side of the reference voxel that is attached to the outside voxel; and
    use a three by three by three (3×3×3) volume of voxels to include the eight primacy voxels, the corresponding eight secondary voxels, and the corresponding eight tertiary voxels, the reference voxel being in the center of the 3×3×3 volume.

19. The apparatus of claim 18, wherein circuitry to determine whether the primary voxel, the secondary voxel or the tertiary voxel is on a same surface as the reference voxel comprises circuitry to pick the primary voxel if the primary voxel is inside the surface of the object unless the corresponding secondary voxel is outside the surface of the object and the corresponding tertiary voxel is inside the surface of the object.

20. The apparatus of claim 18, wherein circuitry to determine whether the primary voxel, the secondary voxel or the tertiary voxel is on a same surface as the reference voxel comprises circuitry to pick the secondary voxel if the primary voxel is outside the surface of the object and the secondary voxel is inside the surface of the object.

21. The apparatus of claim 18, wherein circuitry to determine whether the primary voxel, the secondary voxel or the tertiary voxel is on a same surface as the reference voxel comprises circuitry to pick no voxels if the corresponding secondary voxel is outside the surface of the object and the corresponding tertiary voxel is inside the surface of the object.

22. An article comprising a data processing device-readable medium that stores executable instructions to generate a mesh, the instructions causing a data processing device to:
    locate a reference voxel, the reference voxel being inside a surface of an object and being adjacent to at least one voxel outside the surface; for a voxel outside the surface adjacent to the reference voxel, determine a set of contributing voxels by finding adjacent voxels on the same surface as the reference voxel using voxel morph operators; and
    in a counter-clockwise fashion, form triangles with adjacent contributing voxels and the reference voxel, each triangle having unique directional edges with respect to the other triangles.

23. The article of claim 22, wherein each voxel having a voxel edge field, the article further comprising instructions causing the data processing device to:
    record each triangle; and
    update the voxel edge field for every voxel in each triangle.

24. The article of claim 22, further comprising instructions causing the data processing device to:
    after all possible triangles have been determined, perform smoothing.

25. The article of claim 22, wherein to perform smoothing comprises instructions causing the data processing device to:
    analyze an exposed side of a reference voxel, the reference voxel having neighbor voxels, each neighbor voxel having a surface orientation;
    take an initial guess about the surface orientation; and use voxel morph operators to average the surface orientations.

26. The article of claim 22, wherein instructions causing a data processing device to identify comprises instructions causing a data processing device to:
  evaluate a primary voxel corresponding to a side of a reference voxel, the side of the reference voxel being attached to an outside voxel, the primary voxel being adjacent to the outside voxel and adjacent to a corresponding secondary voxel, the secondary voxel being adjacent to a corresponding tertiary voxel; and
  determine whether the primary voxel, the secondary voxel or the tertiary voxel is on a same surface as the reference voxel.

27. The article of claim 26, further comprising instructions causing a data processing device to:
  evaluate up to eight primary voxels for each side of the reference voxel that is attached to the outside voxel; and
  use a three by three by three (3×3×3) volume of voxels to include the eight primary voxels, the corresponding eight secondary voxels, and the corresponding eight tertiary voxels, the reference voxel being in the center of the 3×3×3 volume.

28. The article of claim 27, wherein instructions causing a data processing device to determine whether the primary voxel, the secondary voxel or the tertiary voxel is on a same surface as the reference voxel comprises instructions causing a data processing device to pick the primary voxel if the primary voxel is inside the surface of the object unless the corresponding secondary voxel is outside the surface of the object and the corresponding tertiary voxel is inside the surface of the object.

29. The article of claim 27, wherein instructions causing a data processing device to determine whether the primary voxel, the secondary voxel or the tertiary voxel is on a same surface as the reference voxel comprises instructions causing a data processing device to pick the secondary voxel if the primary voxel is outside the surface of the object and the secondary voxel is inside the surface of the object.

30. The article of claim 27, wherein instructions causing a data processing device to determine whether the primary voxel, the secondary voxel or the tertiary voxel is on a same surface as the reference voxel comprises instructions causing a data processing device to pick no voxels if the corresponding secondary voxel is outside the surface of the object and the corresponding tertiary voxel is inside the surface of the object.

* * * * *